United States Patent [19]
Mizuta

[11] Patent Number: 5,850,327
[45] Date of Patent: Dec. 15, 1998

[54] MAGNETIC DISC CARTRIDGE WITH PROTRUSION OPPOSING DISC ENTIRELY OUTSIDE RECORDING AREA THEREOF

[75] Inventor: Akira Mizuta, Kanagawa-ken, Japan

[73] Assignee: Fuji Photo Film Co., Ltd., Kanagawa, Japan

[21] Appl. No.: 843,705

[22] Filed: Apr. 16, 1997

[30] Foreign Application Priority Data

Apr. 17, 1996 [JP] Japan ................................. 8-095190

[51] Int. Cl.⁶ ............................................. G11B 23/033
[52] U.S. Cl. .......................................................... 360/133
[58] Field of Search ............................. 360/133; 369/291

[56] References Cited

U.S. PATENT DOCUMENTS

| | | | |
|---|---|---|---|
| 4,626,949 | 12/1986 | Brock et al. | 360/133 |
| 4,814,926 | 3/1989 | Gulbrandsen | 360/133 |
| 4,839,766 | 6/1989 | Kato | 360/133 |
| 4,843,511 | 6/1989 | Downey | 360/133 |
| 4,958,249 | 9/1990 | Kadokura et al. | 360/133 |
| 5,537,281 | 7/1996 | Ma et al. | 360/133 |

FOREIGN PATENT DOCUMENTS 7-19465  11/1987  Japan .

*Primary Examiner*—Craig A. Renner
*Attorney, Agent, or Firm*—Brinks Hofer Gilson & Lione

[57] ABSTRACT

A magnetic disc cartridge includes a casing formed by upper and lower shells bonded together. A magnetic disc is supported for rotation in the casing and includes a recording area and a non-recording area around the recording area. A pair of liners are fixed respectively to the inner surfaces of the upper and lower shells to be opposed to the upper and lower surfaces of the disc. Each of the upper and lower shells is provided with at least one protrusion projecting toward the disk from a portion of the inner surface which is outside the portion of the shell opposed to the recording area of the magnetic disc and is opposed to at least a part of the non-recording area of the magnetic disc, whereby the liners on the respective shells are shifted toward the disk from the inner surfaces of the shells by the protrusions.

16 Claims, 4 Drawing Sheets

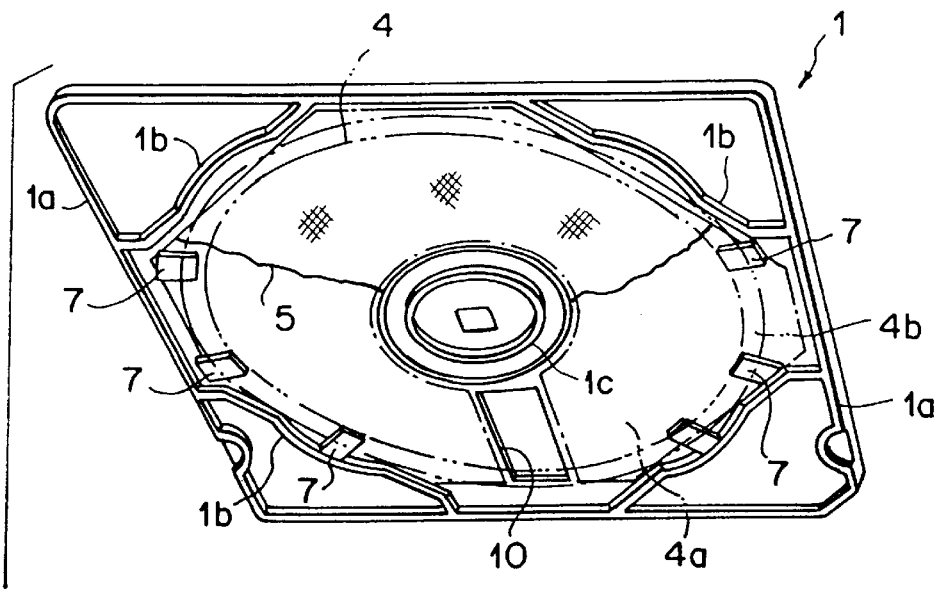
FIG.1
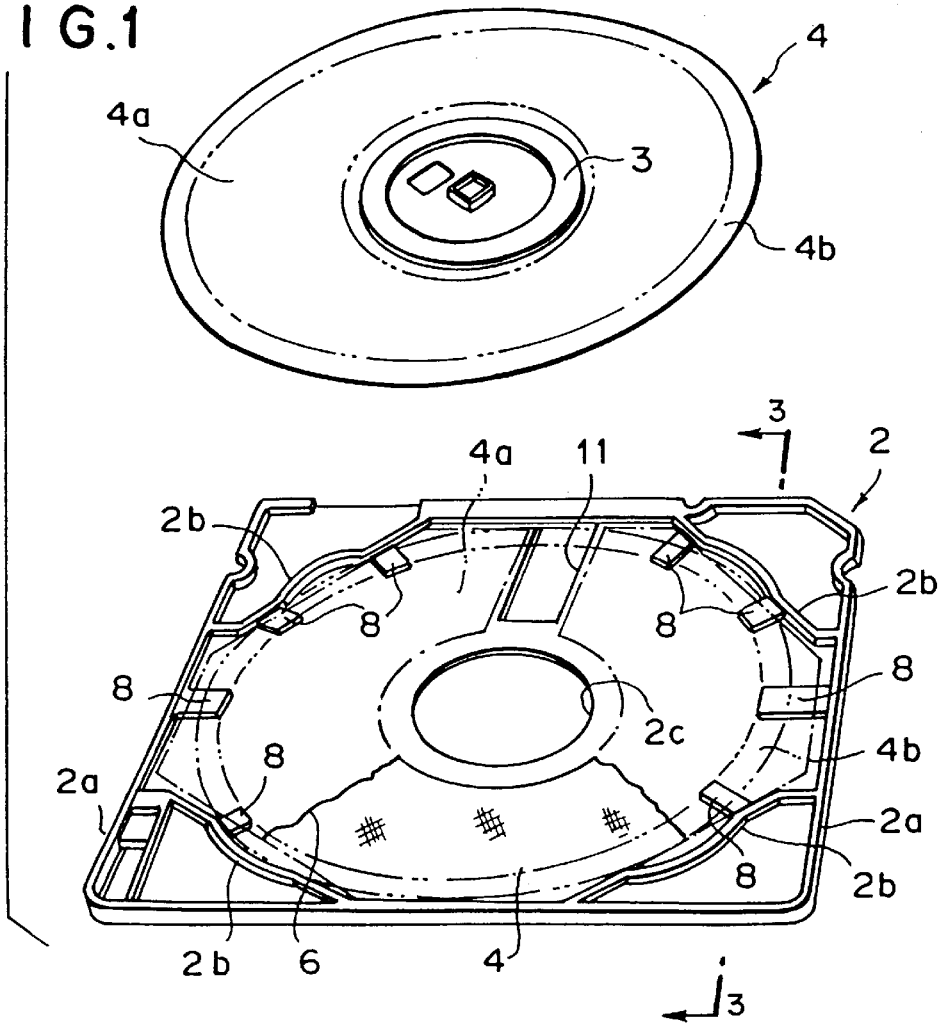

MAGNETIC DISC CARTRIDGE WITH PROTRUSION OPPOSING DISC ENTIRELY OUTSIDE RECORDING AREA THEREOF

BACKGROUND OF THE INVENTION

1. Field of the Invention

This invention relates to a magnetic disc cartridge, and more particularly to a magnetic disc cartridge having liners bonded to the inner surfaces of upper and lower shells which forms a casing in which a magnetic disc is supported for rotation.

2. Description of the Related Art

A magnetic disc cartridge comprises a thin casing formed by upper and lower shells bonded together and a magnetic disc supported for rotation in the casing. The casing has a substantially square upper face slightly larger than the magnetic disc, a lower face having an opening through which a center hub supporting the center of the magnetic disc is exposed outward and a narrow peripheral side face between the upper and lower faces. The casing is further provided with a head insertion opening through which a magnetic head gets access to the magnetic disc for recording or reproduction. The head insertion opening is closed by a shutter when the magnetic disc cartridge is not used in order to prevent entrance of dust or the like into the casing.

A pair of liners formed of, for instance, unwoven fabric are respectively fixed to the inner surfaces of the upper and lower shells of the casing in order to protect the disc surfaces from scratching and to wipe away dust and the like off the disc surfaces upon rotation of the magnetic disc.

In the conventional 3.5" magnetic disc cartridge, the upper and lower shells are very thin-walled moldings and sometimes warp according to the molding conditions and/or storing conditions. The warpage of the upper and lower shells adversely affect rotation of the magnetic disc.

That is, when the warpage of the shells is such that the space inside the casing is enlarged, the rotational resistance of the disc is small since the liners are in contact with the disk at a low pressure and the rotating torque of the disk becomes smaller than a designed value. On the other hand, when the warpage of the shells is such that the space inside the casing is narrowed, the rotational resistance of the disc is large since the liners are in contact with the disk at a high pressure and the rotating torque of the disk becomes larger than the designed value.

Further the thickness of the liners fluctuates due to manufacturing errors, which together with the deformation of the shells increases fluctuation of the rotating torque of the disc.

When the disc rotating torque deviates from the designed value, chucking failure, where the magnetic disc fails to be driven by a rotary spindle which chucks the disc under the magnetic force and rotates the disc, can take place and the reliability of the products deteriorates.

Further there has been proposed, as disclosed, for instance, in Japanese Patent Publication Nos. 7(1995)-19465 and 7(1995)-40427, a magnetic disc cartridge in which ribs are formed on the inner surfaces of the upper and lower shells, thereby lifting a part of the liners toward the disk into contact therewith. This structure is not expected to be effective in suppressing fluctuation in the disk rotating torque due to deformation of the shells described above though somewhat stabilizes the disk rotating torque by stabilizing the contact pressure between the liners and the disc.

SUMMARY OF THE INVENTION

In view of the foregoing observations and description, the primary object of the present invention is to provide a magnetic disc cartridge in which the influence of deformation of the upper and lower shells on the disk rotating torque can be suppressed so that a desired rotating torque can be stably applied to the disc and wobbling of the disc can be suppressed.

The magnetic disc cartridge in accordance with the present invention comprises a casing formed by upper and lower shells bonded together, a magnetic disc which is supported for rotation in the casing and includes a recording area and a non-recording area around the recording area, and a pair of liners fixed respectively to the inner surfaces of the upper and lower shells to be opposed to the upper and lower surfaces of the disc and is characterized in that each of the upper and lower shells is provided with at least one protrusion projecting toward the disk from a portion of the inner surface which is outside the portion of the shell opposed to the recording area of the magnetic disc and is opposed to at least a part of the non-recording area of the magnetic disc, whereby the liners on the respective shells are shifted toward the disk from the inner surfaces of the shells by the protrusions.

It is preferred that the protrusions on the respective shells be at the same distances from the center of the casing in the radial direction of the disk and shifted from each other in the circumferential direction.

Said portion of the inner surface from which the protrusion projects is close to the outer peripheral wall of the shell and to an inner rib of the shell and is a place where the distance between the inner surfaces of the shells hardly varies due to warpage of the shells and where deformation of the shells, if any, can be corrected when the upper and lower shells are mated and bonded together. Accordingly, by virtue of the protrusions formed in such a portion, the liners can be in contact with the disc in a desired state irrespective of deformation of the shells at portions on the protrusions and a desired rotating torque can be constantly applied to the disc, whereby a stabilized driving performance can be obtained and at the same time wobbling of the disc can be suppressed. Thus in accordance with the present invention, the reliability of the products can be improved, which is advantageous also from the viewpoint of cost.

When the protrusions on the respective shells are shifted from each other in the circumferential direction, a clearance always exists on the side of the disc opposite to each of the protrusions and accordingly even if the thickness of the liners fluctuates for reasons of manufacture, the disc cannot be caught between the protrusions and accordingly the disc rotating torque is not affected by fluctuation in the thickness of the liners, whereby a desired rotating torque can be applied to the disc.

BRIEF DESCRIPTION OF THE DRAWINGS

FIG. 1 is an exploded perspective view of a magnetic disc cartridge in accordance with an embodiment of the present invention.

DESCRIPTION OF THE PREFERRED EMBODIMENT

Figure 2:
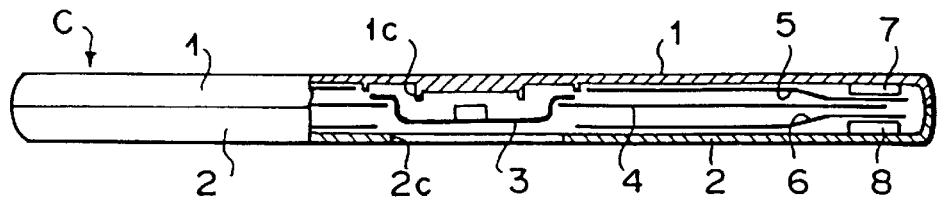
FIG. 2 is a schematic side view partly in cross-section of the magnetic disc cartridge.
Figure 3:
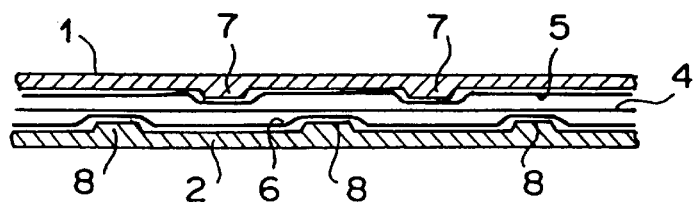
FIG. 3 is a fragmentary cross-sectional view of the magnetic disc cartridge in an assembled state taken along line 3—3 in FIG. 1.

As shown in FIGS. 1 and 2, a magnetic disc cartridge in accordance with an embodiment of the present invention comprises a flat casing C formed by bonding together upper and lower shells 1 and 2 which are moldings of resin such as ABS. A magnetic disc 4 bonded to a center hub 3 is contained in the casing C to be rotatable therein. Upper and lower liners 5 and 6 are disposed on opposite sides of the magnetic disc 4. The magnetic disc 4 has an annular recording area 4a around the center hub 3 and an annular non-recording area 4b around the recording area 4a.

The upper and lower shells 1 and 2 are in the form of substantially square flat plates having side walls 1a and 2a a along the peripheral edges thereof. Inner ribs 1b and 2b are formed in each corner of the shells 1 and 2. The upper and lower shells 1 and 2 are respectively provided with rectangular head insertion openings 10 and 11. The upper and lower liners 5 and 6 are octagonal or circular in shape and are bonded to the inner surfaces of the shells 1 and 2 by ultrasonic welding or the like. The inner ribs 1b and 2b are formed outside the liners 5 and 6 along their contour.

An annular rib 1c for bearing rotation of the center hub 3 is formed on the inner surface of the upper shell 1 at the center thereof. An opening 2c through which a disc drive head (not shown) is engaged with the center hub 3 is formed in the lower shell 2 at the center thereof.

When the magnetic disc 4 is put in the casing C in a predetermined position, the recording area 4a and the non-recording area 4b of the magnetic disc 4 are positioned with respect to the upper and lower shells 1 and 2 as shown by the chained lines.

The upper shell 1 is provided with a plurality of protrusions 7 projecting toward the disk 4 from a portion of the inner surface of the upper shell 1 which is outside the portion of the shell 1 opposed to the recording area 4a of the magnetic disc 4 and is opposed to at least a part of the non-recording area 4b thereof. The protrusions 7 are slightly higher than the rest part of the inner surface of the upper shell 1. Six protrusions 7 are formed on opposite sides of the head insertion opening 10 (three on each side) at substantially regular intervals, and there is no protrusion in the portion diametrically opposed to the head insertion opening 10.

The lower shell 2 is provided with a plurality of protrusions 8 projecting toward the disk 4 from a portion of the inner surface of the lower shell 2 which is outside the portion of the shell 2 opposed to the recording area 4a of the magnetic disc 4 and is opposed to at least a part of the non-recording area 4b thereof. The protrusions 8 are slightly higher than the rest part of the inner surface of the lower shell 2. Eight protrusions 8 are formed on opposite sides of the head insertion opening 11 (four on each side) at substantially regular intervals, and there is no protrusion in the portion diametrically opposed to the head insertion opening 11. The protrusions 8 on the lower shell 2 are shifted from the protrusions 7 on the upper shell 1 in the circumferential direction.

In the state where the upper and lower shells 1 and 2 are bonded together, the protrusions 7 on the upper shell 1 and the protrusions 8 on the lower shell 2 are arranged along a circle, that is, at the same distances from the center of the casing C, but alternate in the circumferential direction so that each of the protrusions 7 is not opposed to any one of the protrusions 8 in the direction of thickness of the casing C. By virtue of the protrusions 7 and 8, the upper and lower liners 5 and 6 are held near the upper and lower surfaces of the magnetic disc 4 and are in contact with the surfaces in a desired state.

Figure 4:
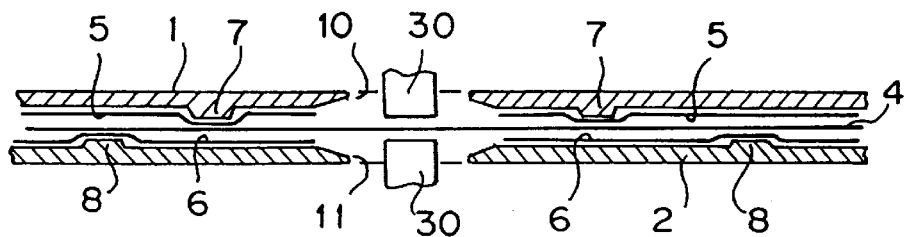
FIG. 4 is a cross-sectional view of a portion of the magnetic disc cartridge around the head insertion opening showing an example of arrangement of the protrusions.
Figure 5:
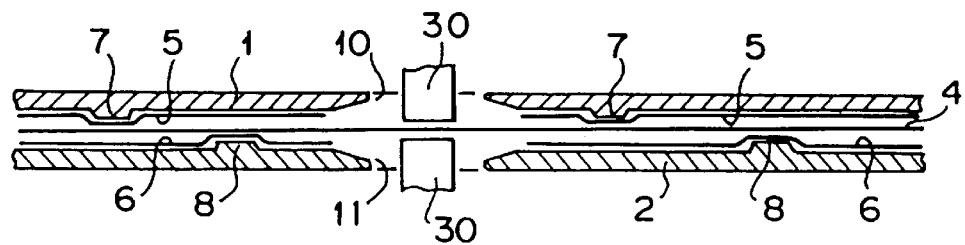
FIG. 5 is a cross-sectional view of a portion of the magnetic disc cartridge around the head insertion opening showing another example of arrangement of the protrusions.

On opposite sides of the head insertion openings 10 and 11 through which a magnetic head 30 is inserted, the protrusions 7 and 8 may be formed either symmetrically about the head insertion openings 10 and 11 as shown in FIG. 4 or asymmetrically about the same as shown in FIG. 5.

Since the protrusions 7 on the upper shell 1 and the protrusions 8 on the lower shell 1 alternate each other, a clearance always exists on the side of the disc 4 opposite to each of the protrusions and accordingly even if the thickness of the liners 5 and 6 fluctuates, the disc 4 cannot be caught from the both sides. By suitably selecting the length in the circumferential direction, height, intervals and the number of the protrusions 7 and 8, a desired rotating torque can be applied to the magnetic disc 4.

When the inner space of the upper and lower shells 1 and 2 is 0.5 to 2.0 mm and the thickness of the liners 5 and 6 is about 0.2 mm, the height of the protrusions 7 and 8 is preferably about 0.1 to 0.5 mm.

It is preferred that the total number of the protrusions 7 and 8 be at least three. Further though the protrusions 7 and 8 may be formed in any place so long as the aforesaid condition is satisfied, wobbling of the surface of the magnetic disc 4 can be suppressed and influence of wobbling of the surface of the magnetic disc 4 on recording and reproduction by the magnetic head 30 can be avoided by densely disposing the protrusions 7 and 8 near the head insertion openings 10 and 11.

Figure 6A:
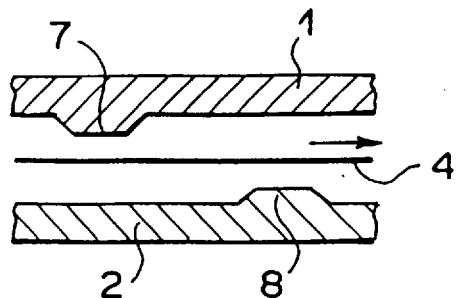
FIGS. 6A to 6C are views showing examples of the shape of the protrusion.
Figure 6B:
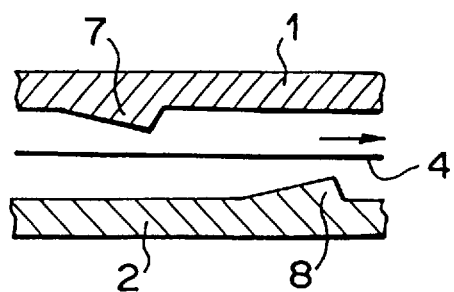
Figure 6C:
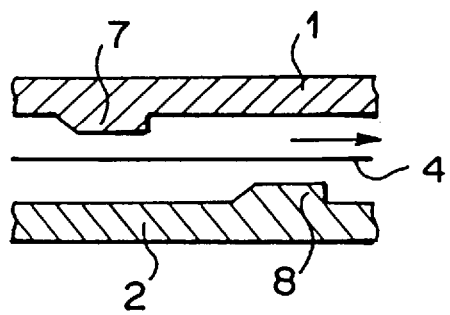

The shape of the protrusions 7 and 8 should preferably be as shown in FIGS. 6A to 6C. That is, the protrusions 7 and 8 shown in FIG. 6A are trapezoid having a flat top surface and inclined opposite sides in cross-section. Those shown in FIG. 6B are triangle in cross-section and have an inclined front face as seen in the direction of rotation of the magnetic disc 4 so that they are low in the front and high in the rear. Those shown in FIG. 6C have a flat top surface, a gently inclined front surface and a steeply inclined rear surface.

Figure 7:
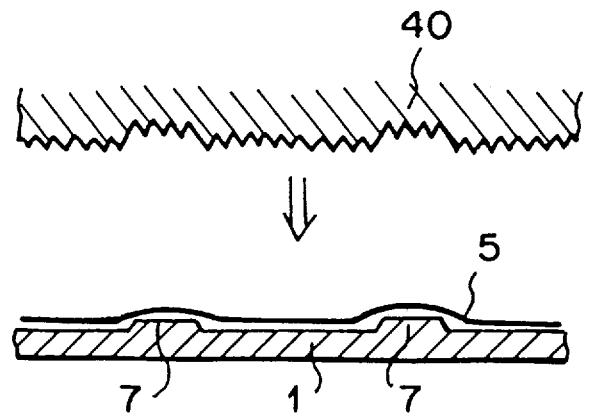
FIG. 7 is a fragmentary cross-sectional view for illustrating an example of welding of the liner.
Figure 8:
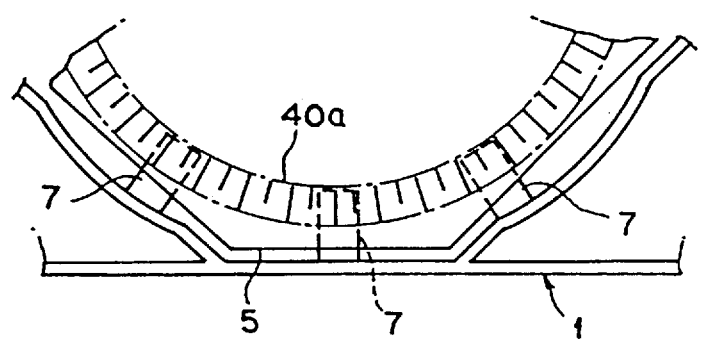
FIG. 8 is a fragmentary plan view showing an example of liner welding pattern.

It is preferred that the liners 5 and 6 be partly bonded to the corresponding shells 1 and 2 in a strip-like pattern. Also to the protrusions 7 and 8, it is preferred that the liners be bonded in an arcuate strip-like pattern 40a as shown in FIG. 8 by ultrasonic welding. In this case, it is preferred that the liners be welded by use of a welding horn 40 having recesses corresponding to the shape of the protrusions 7 and 8 as shown in FIG. 7.

In this embodiment, since the position of the peripheral area including the non-recording area 4b of the magnetic disc 4 is controlled by the protrusions 7 and 8 formed on the inner surfaces of the upper and lower shells 1 and 2, a necessary rotating torque can be freely applied to the magnetic disc 4. Further since the protrusions 7 and 8 are formed near the peripheral edge of the shells 1 and 2, influence of warpage of the shells 1 and 2 on the rotating torque can be reduced. Further since the protrusions 7 and 8 are near the head insertion openings 10 and 11, wobbling of the magnetic disc surface relative to the magnetic head 30 can be suppressed and the magnetic head 30 can be precisely positioned relative to the magnetic disc 4, which reduces read/write errors.

In the magnetic disc cartridge of the present invention, wobbling of the magnetic disc 4 can be prevented and a stabilized rotating torque can be obtained even in the magnetic recording and reproducing system in which the magnetic disc is rotated at a high speed of not lower than 1000 rpm. Accordingly the magnetic disc cartridge of this embodiment can be used for high density recording much higher than the conventional magnetic disc cartridges.

What is claimed is:

1. A magnetic disc cartridge comprising a casing formed by upper and lower shells bonded together, a magnetic disc which is supported for rotation about an axis in the casing and includes a recording area and a non-recording area around the recording area, and a pair of liners fixed respectively to the inner surfaces of the upper and lower shells to be opposed to the upper and lower surfaces of the disc, wherein the improvement comprises that each of the upper and lower shells is provided with at least one protrusion extending longitudinally inward generally toward the axis, and projecting toward the disc from the inner surface which is entirely outside the portion of the shell opposed to the recording area of the magnetic disc and is opposed to at least a part of the non-recording area of the magnetic disc, whereby the liners of the respective shells are shifted toward the disc from the inner surfaces of the shells by the protrusions.

2. A magnetic disc cartridge as defined in claim 1 in which the protrusions on the respective shells are shifted from each other in the circumferential direction.

3. A magnetic disc cartridge as defined in claim 1, wherein the at least one protrusion on the upper shell comprises a plurality of protrusions formed on opposite sides of a head insertion opening positioned in the upper shell.

4. A magnetic disc cartridge as defined in claim 3, wherein the plurality of protrusions are spaced apart at substantially regular intervals and wherein a portion of the upper shell diametrically opposed to the head insertion opening is free of the plurality of protrusions.

5. A magnetic disc cartridge as defined in claim 1, wherein the at least one protrusion on the lower shell comprises a plurality of protrusions formed on opposite sides of a head insertion opening positioned in the lower shell, the lower shell further comprising a portion diametrically opposed to the head insertion opening, wherein the portion diametrically opposed to the head insertion opening is free of the plurality of protrusions.

6. A magnetic disc cartridge as defined in claim 1, wherein the upper and lower shells each comprise a plurality of protrusions formed symmetrically about a respective head insertion opening positioned on each of the upper and lower shells.

7. A magnetic disc cartridge as defined in claim 1, wherein the upper and lower shells each comprise a plurality of protrusions formed asymmetrically about a respective head insertion opening positioned on each of the upper and lower shells.

8. A magnetic disc cartridge as defined in claim 1, further comprising an inner space defined by a distance between the inner surface of the upper shell and the inner surface of the lower shell, the distance having range of about 0.5 mm to 2.0 mm.

9. A magnetic disc cartridge as defined in claim 1, wherein each of the pair of liners has a thickness of about 0.2 mm.

10. A magnetic disc cartridge as defined in claim 1, wherein the at least one protrusion on each of the upper and lower shells, has a height in a range of about 0.1 mm to 0.5 mm.

11. A magnetic disc cartridge as defined in claim 1, wherein the magnetic disc cartridge comprises at least three protrusions on the upper and lower shells, the protrusions positioned closer to a head insertion opening on each of the upper and lower shells than to a portion of the upper and lower shells diametrically opposed to the respective head insertion openings.

12. A magnetic disc cartridge as defined in claim 1, wherein each of the protrusions comprise a trapezoidal cross-section, the trapezoidal cross-section having a substantially flat portion in a plane parallel to a rotational plane of the magnetic disc and a pair of opposite side portions inclined toward the substantially flat portion.

13. A magnetic disc cartridge as defined in claim 1, wherein the at least one protrusion on each of the upper and lower shells comprises a triangular cross-section.

14. A magnetic disc cartridge as defined in claim 13, wherein the triangular cross-section comprises first and second sides protruding from the inner surface of each of the shells, the first side forming a first angle with the inner surface and the second side forming a second angle with the inner surface different than the first angle.

15. A magnetic disc cartridge as defined in claim 1, wherein each of the pair of liners are bonded in a strip-like pattern to the inner surfaces of a respective one of the upper and lower shells.

16. A magnetic disc cartridge as defined in claim 15, wherein each of the pair of liners is bonded in an arcuate strip-like pattern to the protrusions on a respective one of the upper and lower shells.

* * * * *

UNITED STATES PATENT AND TRADEMARK OFFICE
CERTIFICATE OF CORRECTION

PATENT NO. : 5,850,327
DATED : December 15, 1998
INVENTOR(S) : Akira Mizuta

It is certified that error appears in the above-identified patent and that said Letters Patent is hereby corrected as shown below:

In claim 8, line 4, please insert --a-- after "having".

Signed and Sealed this

Twenty-seventh Day of March, 2001

Attest:

NICHOLAS P. GODICI

Attesting Officer

Acting Director of the United States Patent and Trademark Office